United States Patent
Inada et al.

(10) Patent No.: US 11,646,562 B2
(45) Date of Patent: May 9, 2023

(54) DEVICES AND METHODS FOR CURRENT INTERRUPTING USING CURRENT DIVERSION PATH

(71) Applicants: National University Corporation Saitama University, Saitama (JP); TOKYO INSTITUTE OF TECHNOLOGY, Tokyo (JP); The University of Tokyo, Tokyo (JP)

(72) Inventors: Yuki Inada, Saitama (JP); Yasushi Yamano, Saitama (JP); Mitsuaki Maeyama, Saitama (JP); Shungo Zen, Tokyo (JP); Wataru Ohnishi, Tokyo (JP)

(73) Assignees: National University Corporation Saitama University, Saitama (JP); Tokyo Institute of Technology, Tokyo (JP); The University of Tokyo, Tokyo (JP)

( * ) Notice: Subject to any disclaimer, the term of this patent is extended or adjusted under 35 U.S.C. 154(b) by 0 days.

(21) Appl. No.: 17/761,083

(22) PCT Filed: Sep. 15, 2020

(86) PCT No.: PCT/JP2020/034978
§ 371 (c)(1),
(2) Date: Mar. 16, 2022

(87) PCT Pub. No.: WO2021/054338
PCT Pub. Date: Mar. 25, 2021

(65) Prior Publication Data
US 2022/0360067 A1   Nov. 10, 2022

(30) Foreign Application Priority Data
Sep. 17, 2019 (JP) .............................. JP2019-168601

(51) Int. Cl.
*H02H 3/02* (2006.01)
*H02H 3/10* (2006.01)

(52) U.S. Cl.
CPC .............. *H02H 3/025* (2013.01); *H02H 3/10* (2013.01)

(58) Field of Classification Search
CPC ... H01H 2085/0283; H01H 2085/0291; H01H 2085/381; H01H 33/59; H01H 33/596;
(Continued)

(56) References Cited

U.S. PATENT DOCUMENTS 6,492,747 B1 * 12/2002 Hoffmann .............. H01H 9/106
337/5
8,450,881 B2 * 5/2013 Wortberg ............... H01H 9/106
307/131
(Continued)

FOREIGN PATENT DOCUMENTS

CN    109617007 A    4/2019
JP    S50-093569     8/1975
(Continued)

OTHER PUBLICATIONS

International Search Report on PCT/JP2020/034978 dated Dec. 1, 2020 (9 pages).

*Primary Examiner* — Jared Fureman
*Assistant Examiner* — Nicolas Bellido
(74) *Attorney, Agent, or Firm* — Foley & Lardner LLP

(57) ABSTRACT

A current interrupting device includes a current limiting element on a power supply path from a predetermined power supply to a load device. The current limiting element is configured to exhibit a current limiting action when current
(Continued)

flowing in the power supply path exceeds a first current threshold value. The current interrupting device further includes a current diversion path switch, and a controller programmed to control on and off of the current diversion path switch. The controller is programmed to switch a current diversion path switch on from an off state when it is detected that current flowing in the current limiting element is limited to a second current threshold value after the current flowing in the current limiting element has exceeded the first current threshold value, and switch the switch off again after a predetermined switched-on holding time has elapsed since the switch has been switched on.

12 Claims, 14 Drawing Sheets

(58) Field of Classification Search
CPC ...... H01H 50/021; H01H 85/38; H01H 85/46; H01H 9/106; H01H 9/54; H02H 1/0007; H02H 3/025; H02H 3/08; H02H 3/087; H02H 3/10

See application file for complete search history.

(56) References Cited

U.S. PATENT DOCUMENTS

| | | | |
|---|---|---|---|
| 11,069,502 | B2 | 7/2021 | Tokoyoda et al. |
| 2011/0096448 | A1* | 4/2011 | Wortberg ............... H01H 9/106 361/62 |
| 2012/0134062 | A1* | 5/2012 | Wortberg ............. H02H 3/0935 361/87 |
| 2015/0236502 | A1* | 8/2015 | Xu ......................... H02H 3/025 361/93.9 |
| 2018/0244219 | A1* | 8/2018 | Sugisawa ............... H02H 7/226 |
| 2018/0277325 | A1 | 9/2018 | De Palma et al. |

FOREIGN PATENT DOCUMENTS

| | | | |
|---|---|---|---|
| JP | 2008-059967 | 3/2008 | |
| JP | 2008-270171 | 11/2008 | |
| JP | 2009-218054 | 9/2009 | |
| JP | 2018-535629 | 11/2018 | |
| JP | 6456575 | 1/2019 | |
| JP | 6497488 B1 * | 4/2019 | ............... H02H 3/08 |
| WO | WO-2012161277 A1 * | 11/2012 | ............... H01L 39/16 |

* cited by examiner (a)

Interruption of AC current (b)

Interruption of DC current

DEVICES AND METHODS FOR CURRENT INTERRUPTING USING CURRENT DIVERSION PATH

CROSS-REFERENCE TO RELATED PATENT APPLICATIONS

This application is a U.S. National Phase Application under 35 U.S.C. § 371 of International Application No. PCT/JP2020/034978, filed Sep. 15, 2020, which claims the benefit of priority to Japanese Application No. 2019-168601, filed on Sep. 17, 2019, the entire contents of which are hereby incorporated by reference.

TECHNICAL FIELD

The present invention relates to a current interrupting device and a current interrupting method.

BACKGROUND ART

Conventionally, in an electric installation such as an electric power system, etc. for power transmission and distribution, there is a known breaker (a switch device) that interrupts an electric path in the electric power system for protecting electrical equipment from excessive abnormal current caused by accidental events such as lightning strikes. The conventional breaker as described above includes a magnetic circuit breaker (an arc chute), a vacuum circuit breaker, a gas circuit breaker, and so forth.

Furthermore, in the above-described conventional breaker, an arc discharge is caused when an internal electric path is opened. Here, at a timing where a current level in the electric power system becomes zero (a current zero point), a power supply to the arc becomes zero temporarily. Therefore, in many cases, an arc extinction point of the arc (interruption point) coincides with the current zero point. Therefore, in the above-described conventional breaker, it is required to wait for the current zero point in a passive manner, or it is required to actively execute an operation for making the current level in the electric power system to approach zero (a current limiting operation by an injection of counter current, an arc extinction, and so forth).

However, when the interruption is to be performed by waiting for the current zero point, a certain amount of time may be required until the timing for the interruption, and there is a risk in that the electric installation in the electric power system is damaged by being exposed to the excessive abnormal current.

In addition, in a case in which the interruption is to be performed via the current limiting operation in the event of occurrence of the abnormal current, a counter current injection circuit, etc. for performing, in addition to the interrupting function, the current limiting operation needs to be provided separately. Thus, a size of an interrupting device tends to be increased as a whole.

On the other hand, the interrupting device that performs the current limiting and the interruption by using a current limiting fuse in the electric power system is also known. For example, JP2008/59967A proposes the interrupting device provided with the current limiting fuse. In the interrupting device proposed in JP2008/59967A, when the abnormal current is caused, the electric path that functions as a power transmission path at a normal state is interrupted by the circuit breaker, and the abnormal current is diverted to the current limiting fuse. By achieving arc extinction of arc discharge in the current limiting fuse, the current limiting is performed until completion of the interruption where the abnormal current becomes zero is essentially achieved.

In addition, a DC breaker that interrupts large current by using a fuse is also proposed in JP6456575B. This DC breaker has a fuse interrupting part and a high-speed disconnector that are arranged in parallel with each other, and when accidental current is detected, the DC breaker performs the interruption by opening the high-speed disconnector to divert the large current to the fuse.

Both of the interrupting devices proposed in JP2008/59967A and JP6456575B have a simpler configuration compared with the arc chute, the vacuum circuit breaker, and the gas circuit breaker described above, and it is also possible to reduce the size of the devices as a whole.

SUMMARY OF INVENTION

However, a current limiting function of the current limiting fuse is limited. Thus, in a case in which the interruption is to be performed by using the current limiting fuse, although the current limiting can be performed to some extent depending on the level of the abnormal current, etc., a situation in which a current limiting action reaches a limiting point (the upper limit of an interrupting capacity) before the abnormal current is limited to zero is expected. In this case, it may not be possible to reduce the abnormal current in the electric power system to zero, or it will take a long time until the abnormal current is reduced to zero.

In contrast, the interrupting device proposed in JP2008/59967A employs a circuit configuration in which a current limiting resistance is arranged in parallel with the current limiting fuse, thereby supplementing a current limiting performance of the current limiting fuse by the current limiting resistance. However, because the current limiting resistance needs to be provided in addition to the current limiting fuse, there is a concern about an increase in the number of parts, and an increase in a complexity of a device configuration and an increase in a manufacturing cost due to the increase in the number of parts. Especially, depending on types of the electric power system to which the interrupting device to be applied, levels of the abnormal current, and so forth, there is a risk in that a further increase in the size of the device and a further increase in the manufacturing cost are caused due to higher demands for the current limiting performance required for the current limiting resistance.

In addition, even if it is possible to achieve the interruption by performing the current limiting until the abnormal current reaches zero within a current limiting capacity of the current limiting fuse, it takes a relatively long time for performing the current limiting, and it may not be possible to complete the current limiting and the interruption promptly.

In light of these circumstances, an object of the present invention is to provide a current interrupting device capable of suitably executing a current limiting and an interruption of an abnormal current while suppressing an increase in a size of the device and a manufacturing cost, and to provide a current interrupting method.

Solution to Problem

According to one aspect of the present invention, a current interrupting device is provided. The current interrupting device includes: a current limiting element provided on a power supply path from a predetermined power supply to a load device, the current limiting element being configured to exhibit a current limiting action when current flowing the power supply path exceeds a first current threshold value; a current diversion path switch capable of switching on and off of an electric conduction of a current diversion path, the current diversion path switch being connected in parallel with the power supply path, and a controller configured to control on and off of the current diversion path switch. The controller is configured to switch the current diversion path switch on from an off state when it is detected that current flowing the current limiting element is limited to a second current threshold value after the current flowing the current limiting element has exceeded the first current threshold value. The controller is also configured to switch the current diversion path switch off again after a predetermined switched-on holding time has elapsed since the current diversion path switch has been switched on.

According to another aspect of the present invention, a current interrupting method executed in a current interrupting device is provided. The current interrupting device is provided with a current limiting element provided on a power supply path from a predetermined power supply to a load device, the current limiting element being configured to exhibit a current limiting action when current flowing the power supply path exceeds a first current threshold value, and a current diversion path switch capable of switching on and off of an electric conduction of a current diversion path, the current diversion path switch being connected in parallel with the power supply path. The current diversion path switch is switched on from an off state when it is detected that current flowing the current limiting element is limited to a second current threshold value after the current flowing the current limiting element has exceeded the first current threshold value. The current diversion path switch is also switched off again after a predetermined switched-on holding time has elapsed since the current diversion path switch has been switched on.

DESCRIPTION OF EMBODIMENTS

In the following, an embodiment of the present invention will be described with reference to the drawings.

In this description, "abnormal current" means current (overcurrent) that is caused by accidental factors such as short circuit, ground fault, and so forth and that is higher than a level of a current (steady current) expected at the time of normal (steady) operation of an electric power system.

In addition, a term "electrical resistance" as used herein also includes AC resistance (impedance) in addition to DC resistance.

Furthermore, in this description, "current limiting" means a phenomenon or an operation for reducing a current value of the abnormal current over time.

Furthermore, "interruption" means an operation for causing a level of the current flowing any current path between the power supply side and the load side to reach substantially zero in the object electric power system. Especially, the interruption is an operation for cutting an electrical connection between the power supply and the load while eliminating transient voltage due to the abnormal current among an electric potential difference between the power supply and the load.

First Embodiment

Figure 1:
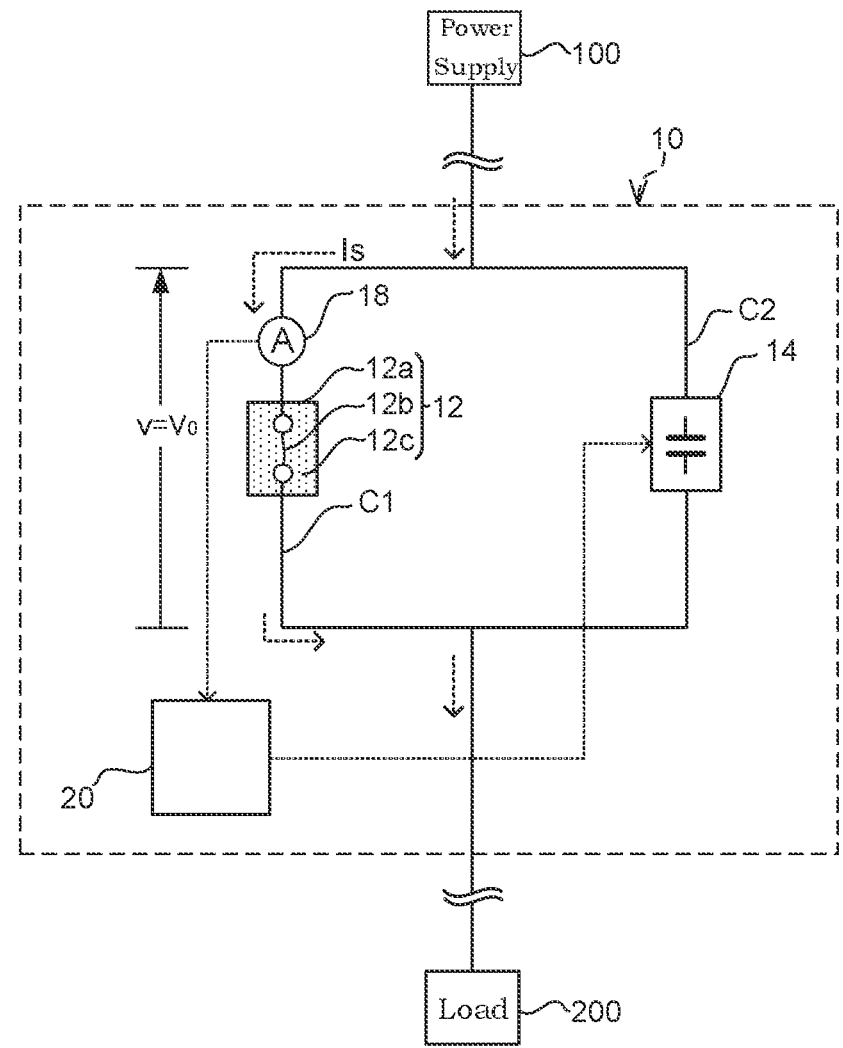
FIG. 1 is a diagram explaining a configuration of a current interrupting device according to a first embodiment of the present invention.

FIG. 1 is a diagram explaining a configuration of a current interrupting device 10 according to a first embodiment. As shown in the figure, the current interrupting device 10 in this embodiment is provided on the electric power system for power transmission from a predetermined power supply 100 to a load device 200.

As the electric power system to which the current interrupting device 10 in this embodiment is applied, an existing railway electrification system and an electric transmission system and an electric distribution system for supplying electric power to electric power transmission and distribution consumers, and in addition, next-generation electric transmission and distribution systems such as a so-called smart-grid, a super-grid, and so forth are expected.

In addition, in order to simplify the description and the drawings, it is assumed that the current interrupting device 10 is applied to a DC electric power system. However, the configuration of the current interrupting device 10 described below may also be applied to an AC electrical power system by appropriately applying a little correction.

As shown in FIG. 1, the current interrupting device 10 is provided with a current limiting fuse 12, a semiconductor power module 14, and a controller 20 serving as a controller.

The current limiting fuse 12 is provided on a main power supply path C1 serving as an electric path for the power transmission from the power supply 100 to the load device 200, and the current limiting fuse 12 functions as a current limiting element. More specifically, the current limiting fuse 12 includes a case body 12a, an electrically conductive fusing element 12b accommodated inside the case body 12a, and arc-extinguishing sand 12c that is filled around the fusing element 12b. Conductive plates (not shown) connected to the fusing element 12b are respectively provided on both contact points of the current limiting fuse 12. The fusing element 12b is electrically connected to the main power supply path C1 via the respective conductive plates on the both contact points.

The fusing element 12b is made of a metal material that functions as a conductive material having essentially zero electrical resistance when the current flowing through the current limiting fuse 12 (hereinafter, also simply referred to as "a fuse current $i_f$") is equal to or lower than a predetermined melting current $I_{th1}$ (a first current threshold value), whereas the metal material is melted when the fuse current $i_f$ exceeds the melting current $I_{th1}$.

In other words, the fusing element 12b is configured such that the melting current $I_{th1}$ is higher than steady current $I_s$, which is the fuse current $i_f$ expected at the normal state, and is lower than the fuse current $i_f$ expected when the abnormal current is caused.

Therefore, when the abnormal current is caused and the fuse current $i_f$ exceeds the melting current $I_{th1}$, the fusing element 12b starts to melt, and the practical electrical resistance of the current limiting fuse 12 is increased. Furthermore, as the melting of the fusing element 12b is progressed and a fused state is established, the electricity transmission path in the current limiting fuse 12 is formed of the arc-extinguishing sand 12c having a high electrical resistance.

The arc-extinguishing sand 12c absorbs the energy of the arc generated by the fusing of the fusing element 12b. In other words, a current limiting action is obtained as the arc resistance is increased successively (as the fuse current $i_f$ is continued to be reduced) by the dissipation of the energy of the abnormal current arc to the arc-extinguishing sand 12c. As an arc extinction is progressed to a limit at which the current limiting action by the arc-extinguishing sand 12c can be obtained, the reduction of the current is not progressed further more, and a state in which almost no fuse current $i_f$ is reduced is established. In other words, this state corresponds to the limiting point for the current limiting action of the current limiting fuse 12. Even when the current limiting fuse 12 has exceeded the limiting point for the current limiting action, the current limiting fuse 12 will continue to exhibit the arc extinction by the arc-extinguishing sand 12c (an energy absorbing effect for the abnormal current arc) to a certain extent. The current limiting fuse 12 then approaches a practically insulative material by successively increasing its electrical resistance also in response to the progression of the arc extinction after the current limiting fuse 12 has exceeded the limiting point for the current limiting action.

The semiconductor power module 14 is provided on a current diversion path C2 that is connected in parallel with the main power supply path C1. The semiconductor power module 14 functions as a current diversion path switch that switches on and off of the electrical conduction of the current diversion path C2 in accordance with an instruction signal from the controller 20. Especially, the semiconductor power module 14 may be formed of a semiconductor element capable of switching on and off of the current diversion path C2 on the order of several milliseconds, such as an IGBT (insulated gate bipolar transistor) module, MOSFET (a metal oxide semiconductor field-effect transistor), or the like.

The semiconductor power module 14 allows the electrical conduction of the current (hereinafter, also simply referred to as "module current $i_{pm}$") equal to or lower than the design-defined allowable current. In addition, the semiconductor power module 14 in this embodiment is configured with the allowable current having a value exceeding a sum of residual abnormal current, which will be described below, and the current (hereinafter, simply also referred to as "the steady current $I_s$") defined on the basis of the electric potential difference between the power supply 100 and the load device 200 (hereinafter, also simply referred to as "steady voltage $V_0$") at the normal state.

The controller 20 functions as a controller for controlling on and off of the semiconductor power module 14. Especially, the controller 20 acquires the current detected value (in other words, the detected value of the fuse current $i_f$) that is detected by a current sensor 18 provided on the main power supply path C1, and appropriately sets the semiconductor power module 14 to an on or off state on the basis of the acquired fuse current $i_f$.

More specifically, when the fuse current $i_f$ acquired from the current sensor 18 is maintained at or below a predetermined current-diversion threshold value $i_{th2}$, the controller 20 maintains the semiconductor power module 14 at the off state. By doing so, in the normal state in which the abnormal current is not caused, a state in which the electrical conduction of the current diversion path C2 is interrupted is established.

On the other hand, when the controller 20 determines that the fuse current $i_f$ acquired from the current sensor 18 falls below the current-diversion threshold value $i_{th2}$, the semiconductor power module 14 is switched on from the off state by the controller 20. Furthermore, the controller 20 determines whether or not a switched-on holding time Δt, which will be described below, has elapsed after the semiconductor power module 14 is switched on. When the controller 20 detects that the switched-on holding time Δt has been elapsed, the controller 20 switches the semiconductor power module 14 to the off state again.

The on/off control of the semiconductor power module 14 performed by the controller 20 will be described below in more detail.

The controller 20 for executing each of the above-described processes is formed of a computer, especially a microcomputer including a central processing unit (a CPU), a read only memory (a ROM), a random access memory (a RAM), and an input/output interface (an I/O interface). The controller 20 is programmed so as to execute each of the above-described processes. The controller 20 may be configured as a single device, or the controller 20 may be configured by being distributed over a plurality of devices and may be configured to execute each of the processes in this embodiment by performing a distributed processing by the plurality of devices.

The operation of the current interrupting device 10 having the above-described configuration will be described with particular reference to FIGS. 2A to 2C, and 3. In the following description, the description will be given by assuming that accidental factors, such as a lightning overvoltage, etc., which causes the abnormal current between the power supply 100 and the current interrupting device 10, are caused. In other words, a situation in which the power supply 100 side of the current interrupting device 10 is the high-potential side of the voltage that may cause the abnormal current, the load device 200 side of the current interrupting device 10 is the low-potential side, and the abnormal current flows from the power supply 100 towards the load device 200 is assumed.

However, with a little correction, the following description may also be applied similarly even to a case in which the abnormal current flows from the current interrupting device 10 towards the power supply 100 by the occurrence of the accidental factors between the current interrupting device 10 and the load device 200.

Figure 2A:
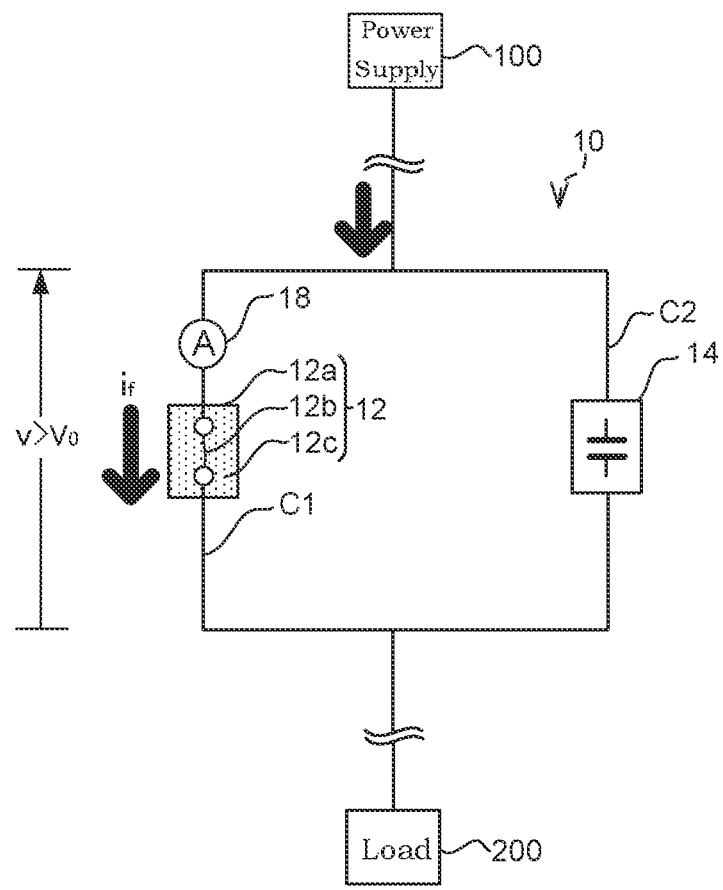
FIG. 2A is a diagram explaining a state of the current interrupting device immediately after occurrence of abnormal current.
Figure 2B:
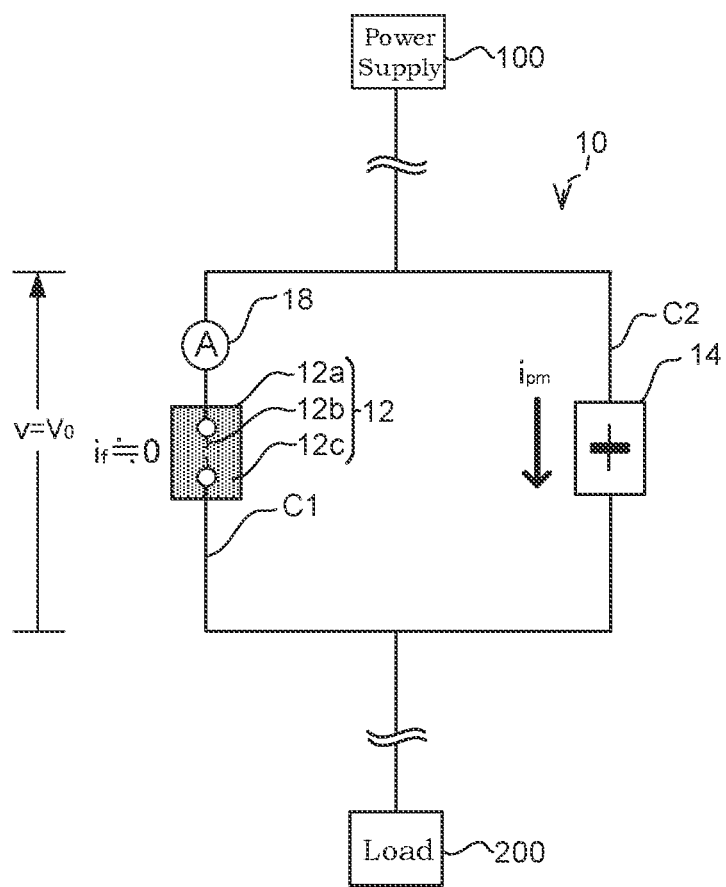
FIG. 2B is a diagram explaining a state of the current interrupting device when current is diverted (when a semiconductor power module is switched on).
Figure 2C:
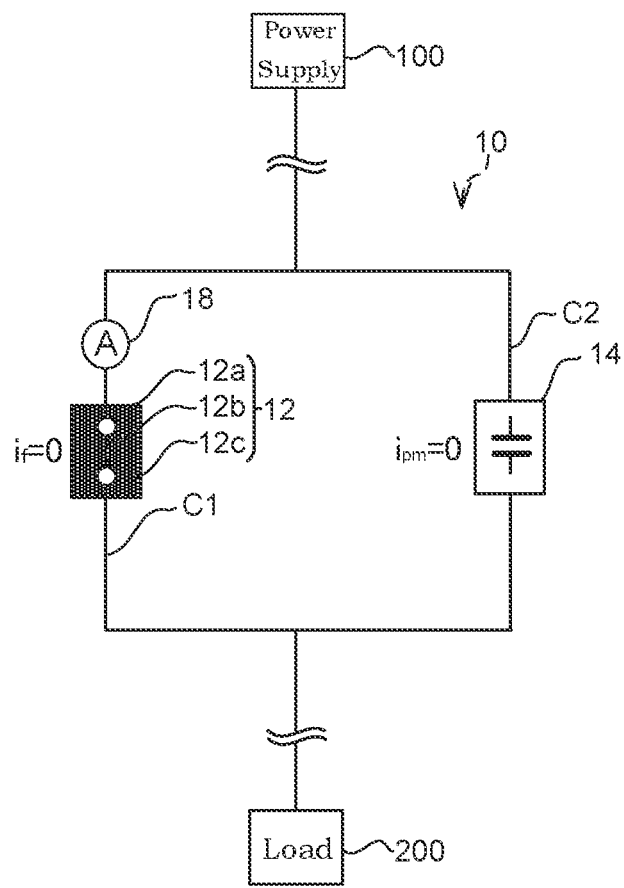
FIG. 2C is a diagram explaining a state of the current interrupting device when interruption is performed (when the semiconductor power module is switched off again).

FIG. 2A is a diagram explaining a state of the current interrupting device 10 immediately after occurrence of the abnormal current. FIG. 2B is a diagram explaining a state in which the abnormal current is caused and the semiconductor power module 14 is turned on (when the current is diverted). FIG. 2C is a diagram explaining a state at which the interruption of the abnormal current is completed.

Figure 3:
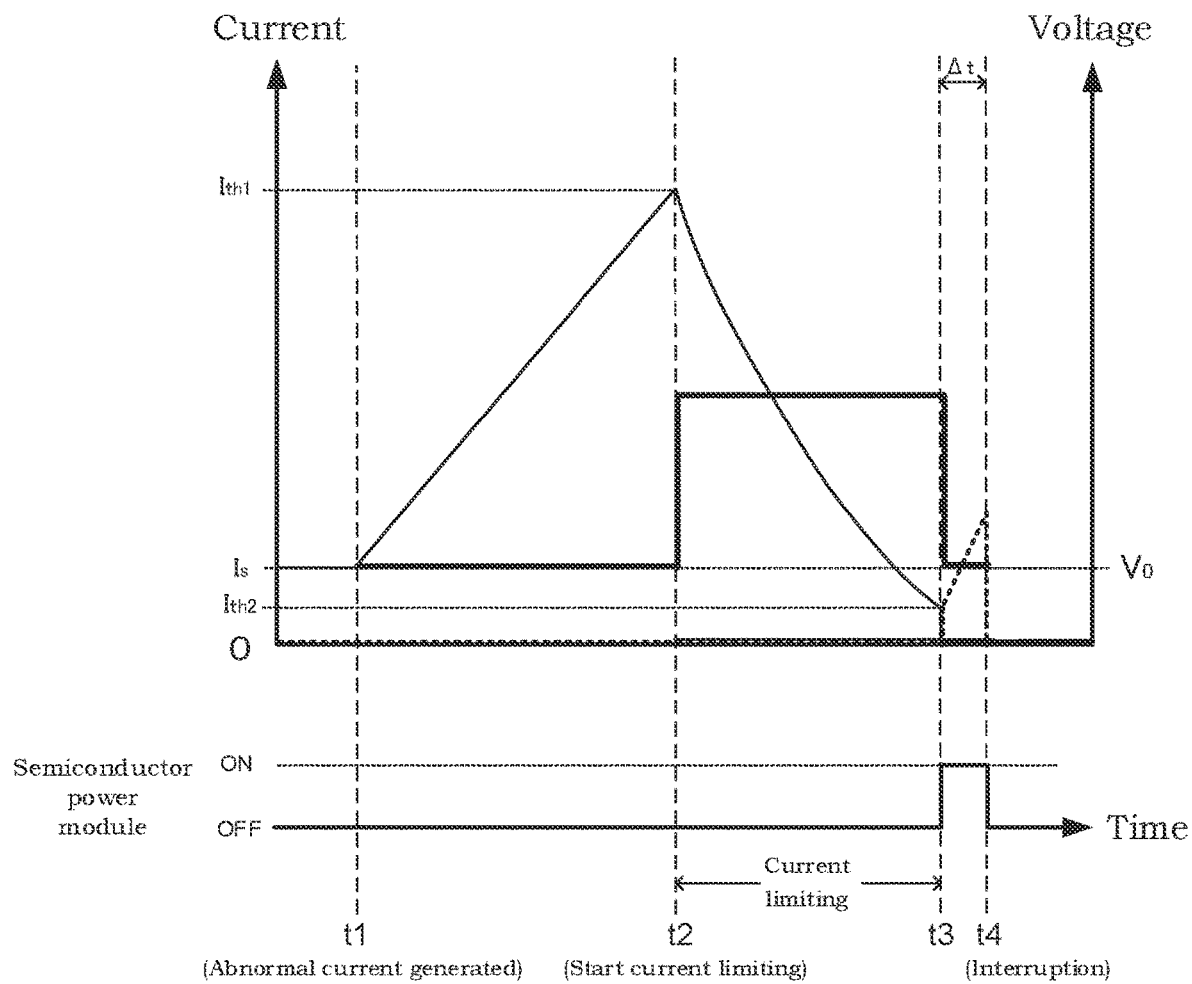
FIG. 3 is a graph explaining changes in voltage and current over time from occurrence of the abnormal current to the interruption via a current limiting.

Furthermore, FIG. 3 is a graph explaining changes in voltage and current over time in the current interrupting device 10 from the occurrence of the abnormal current to the interruption via the current limiting as shown in FIGS. 2A to 2C. In general, the time for achieving the interruption from the occurrence of the abnormal current as shown in FIG. 3 falls, for example, within a range from several tens of milliseconds to several hundreds of milliseconds although it may differ depending on specifications of respective component parts of the current interrupting device 10 and the aspect of the electric power system to which the current interrupting device 10 is applied.

When the abnormal current is caused by the overvoltage caused between the power supply 100 and the current interrupting device 10 (time t1 in FIG. 3), a large current exceeding the steady current $I_s$ flows from the power supply 100 through the main power supply path C1 serving as the load device 200 (see FIG. 2A). Therefore, the fuse current $i_f$ is increased within a short period of time (from time t1 to time t2 in FIG. 3).

As the fuse current $i_f$ is increased to exceed the melting current $I_{th1}$, the fusing element 12b of the current limiting fuse 12 reaches the fused state from a molten state. Thus, the energy of the arc formed at substantially the same time as the fusing is dissipated to the arc-extinguishing sand 12c, thereby successively increasing the electrical resistance of the current limiting fuse 12. As the electrical resistance is successively increased as described above, the fuse current $i_f$ is decreased gradually (after time t2 in FIG. 3). In other words, after time t2, a state in which the current limiting action by the current limiting fuse 12 is exhibited is established.

Next, when the fuse current $i_f$ is decreased to the current-diversion threshold value $i_{th2}$, the semiconductor power module 14 is switched on from the off state by the controller 20 (time t3 in FIG. 3).

Here, the current-diversion threshold value $i_{th2}$ can be appropriately set from the viewpoint of how much the current limiting by the current limiting fuse 12 is to be continued in order to subsequently execute, in a suitable manner, the interruption, which is achieved by switching the semiconductor power module 14 to the off state again.

Especially, in a case in which it is important to achieve the interruption by the current interrupting device 10 as promptly as possible, it is possible to set the current-diversion threshold value $i_{th2}$ to have a relatively high value such that, while maintaining the module current $i_{pm}$ so as not to exceed the allowable current of the semiconductor power module 14 at the time of the subsequent interruption, the shifting to the interruption is achieved as promptly as possible.

On the other hand, in a case in which it is important to cause the current limiting action by the current limiting fuse 12 to be exhibited to the utmost extent, it is possible to set the current-diversion threshold value $i_{th2}$ to have a relatively low value such that the fuse current $i_f$ is decreased sufficiently by the current limiting within a range in which the timing of the shifting to the interruption is not delayed greatly.

When the fuse current $i_f$ then reaches the current-diversion threshold value $i_{th2}$, the semiconductor power module 14 is switched on from the off state by the controller 20 (time t3 in FIG. 3). When the semiconductor power module 14 is switched on, the current is diverted from the main power supply path C1 to the current diversion path C2. In other words, compared with the main power supply path C1, on which the current limiting fuse 12 showing the high electrical resistance due to the progression of the current limiting to a certain extent is arranged, the electrical resistance of the current diversion path C2 after the semiconductor power module 14 is switched on is considerably low, and therefore, the current path is changed from the main power supply path C1 to the current diversion path C2 (see FIG. 2B). Therefore, while the fuse current $i_f$ is decreased nearly to zero, the module current $i_{pm}$ is increased.

Furthermore, when the switched-on holding time Δt has elapsed after the semiconductor power module 14 is switched on, the semiconductor power module 14 is switched off again by the controller 20 (time t4 in FIG. 3). The interruption is completed when the semiconductor power module 14 is switched off again (see FIG. 2C).

In the above, although the fuse current $i_f$ becomes substantially zero in a period between time t3 and time t4 during which the semiconductor power module 14 is set to the on state, the arc extinction by the current limiting fuse 12 is continued. Along with the progression of the arc extinction, the state within the current limiting fuse 12 is successively shifted from a non-insulated state (a state in which the arc is remaining) to a substantially insulated state (a state in which the arc is completely extinguished and the electrical conduction inside the fuse is completely interrupted by the arc-extinguishing sand). This process progresses in a similar manner even in a case in which the current diversion is executed (time t3 in FIG. 3) before the timing at which the current limiting action by the current limiting fuse 12 reaches the practical limiting point.

Therefore, the switched-on holding time Δt in this embodiment is set such that the electrical resistance of the current limiting fuse 12 exceeds a predetermined resistance threshold value at the timing at which the semiconductor power module 14 is switched off again. The resistance threshold value is set from the viewpoint of determining whether or not the electrical resistance of the current limiting fuse 12 has been increased to the extent so that it can be considered as the substantially insulative material.

Especially, from the viewpoint of switching the semiconductor power module 14 to the off state again (completing the interruption), the resistance threshold value is set in advance by experiment etc. by considering a suitable insulating property required for the current limiting fuse 12 depending on the circuit configuration of the current interrupting device 10 or the aspect of the electric power system to which the current interrupting device 10 is applied.

Therefore, in this embodiment, a value of the switched-on holding time Δt is set such that the semiconductor power module 14 is maintained at the on state until the timing at which the current limiting fuse 12 becomes the substantially insulative material (the timing at which the current limiting action at least exceeds the limiting point).

By doing so, it is possible to prevent occurrence of a situation in which the abnormal current, which has been passed through the current diversion path C2, flows into the current limiting fuse 12 when the semiconductor power module 14 is switched off again. In other words, a suitable interruption is achieved by switching the semiconductor power module 14 to the off state.

Next, the effects achieved by the current interrupting device 10 in this embodiment will be described with a comparison with the conventional technique.

Figure 4:
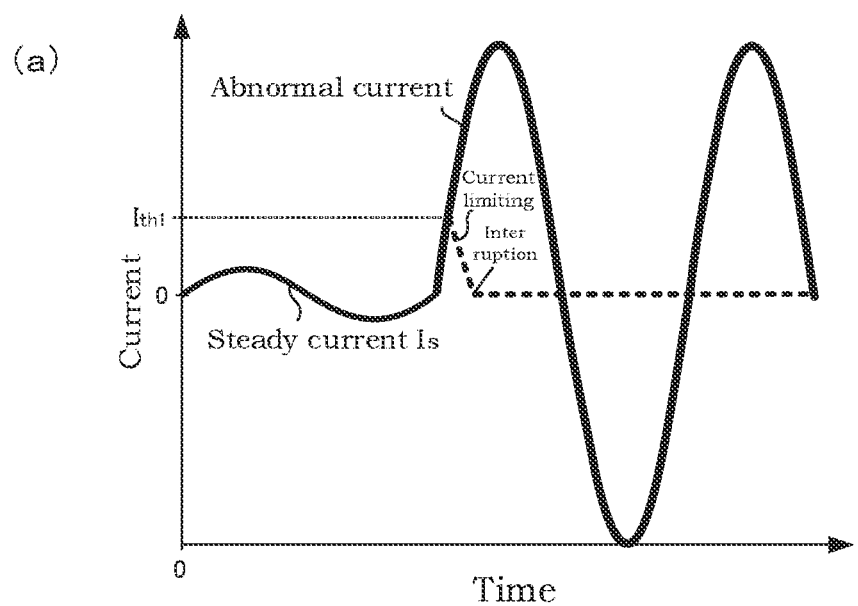
FIG. 4 is a diagram explaining an effect of the current interrupting device in this embodiment.
Figure 4:
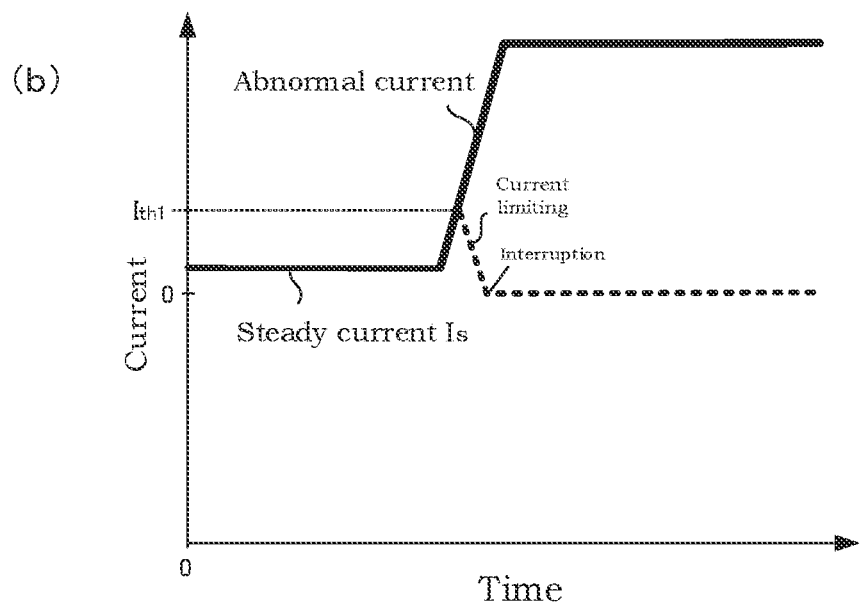

FIG. 4 is a diagram explaining the effect achieved by the current interrupting device 10 in this embodiment. Especially, FIG. 4(a) assumes a case in which the abnormal current caused in the AC electrical power system is to be interrupted. On the other hand, FIG. 4(b) assumes a case in which the abnormal current caused in the DC electric power system is to be interrupted.

Figure 5:
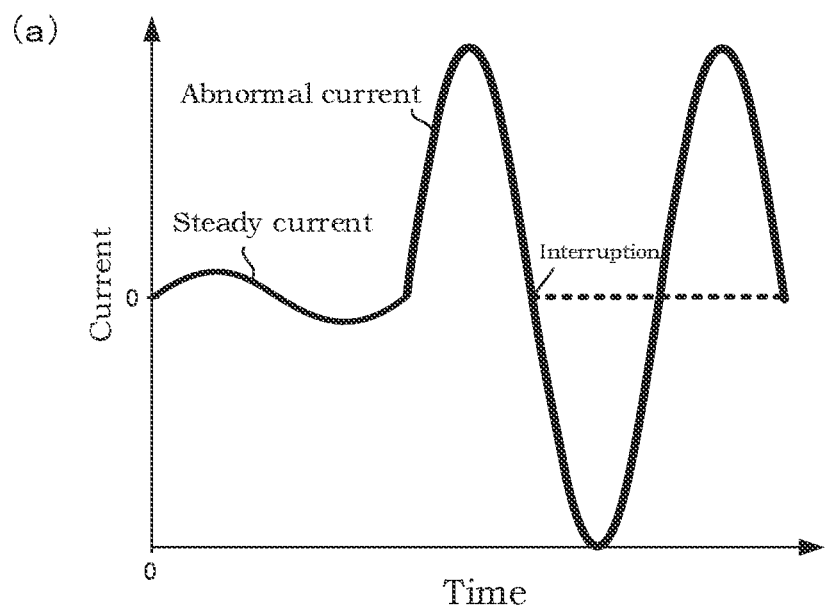
FIG. 5 is a diagram explaining the conventional technique.
Figure 5:
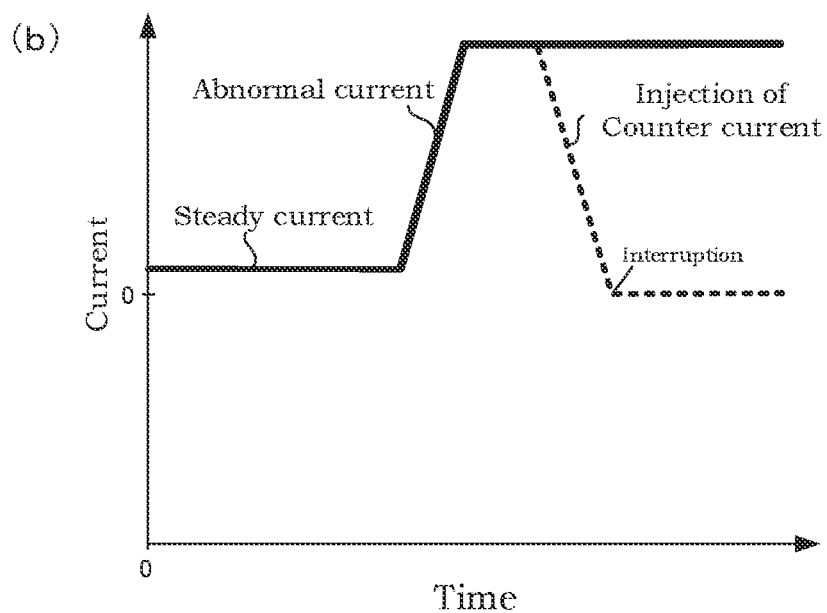

FIG. 5 is a diagram explaining the conventional technique. Especially, FIG. 5(a) assumes a case in which the abnormal current caused in the AC electrical power system is to be interrupted. On the other hand, FIG. 5(b) assumes a case in which the abnormal current caused in the DC electric power system is to be interrupted.

In the conventional AC electrical power system, a gas circuit breaker, a vacuum circuit breaker, and so forth are used as the breaker for performing the interruption in the electric power system when the abnormal current is caused. In general, the breaker is not provided with a current limiting function. Thus, when the abnormal current is detected, the interruption needs to be performed by waiting for the timing at which the AC current in the AC electrical power system becomes zero (a current zero point). However, as shown in FIG. 5(a), depending on the detection timing of the abnormal current, the interruption is performed at the current zero point after the current due to the abnormal current has reached the peak. In this case, because the interruption is performed after a large current has flowed through the AC electrical power system, there is a concern that an electric installation in the system is damaged.

In contrast, in the current interrupting device 10 in this embodiment, when the fuse current $i_f$ exceeds the melting current $I_{th1}$ that is lower than the peak of the abnormal current, the current limiting is started promptly, and the interruption is executed subsequently (see FIG. 4(a)). Therefore, it is possible to prevent the damage of the electric installation due to the large current flowing through the AC electrical power system.

Next, an arc chute (a magnetic circuit breaker), the vacuum circuit breaker, a semiconductor breaker, and a combined breaker formed by combining the vacuum circuit breaker and a semiconductor breaker are used as the breaker that performs the interruption when the abnormal current is caused in the conventional DC electric power system. However, all of these devices are of a large size, and there is a problem in that an installation may be difficult depending on the DC electric power system to which they are to be applied.

In addition, because the arc chute, the vacuum circuit breaker, and the combined breaker described above do not have the current limiting function by themselves, there may be a case in which a current injection circuit for injecting counter current for canceling out the abnormal current is provided when the interruption is performed in the DC electric power system.

However, with the current injection circuit, it is required to detect the level of the abnormal current first, and the counter current is then generated at the level that cancels the detected abnormal current. In other words, as shown in FIG. 5(b), injection of the counter current by the current injection circuit is performed after the large current, which is to be canceled out in the system, is generated. As a result, similarly to the case with the AC electrical power system described above, there is a concern that the electric installation in the system is damaged by the flow of the large current.

In contrast, with the current interrupting device 10 in this embodiment, as the fuse current $i_f$ exceeds the melting current $I_{th1}$ that is lower than the peak of the abnormal current, the current limiting is started promptly, and the interruption is executed subsequently (see FIG. 4(b)). Thus, it is possible to prevent the damage of the electric installation in the system due to the interruption after the flow of the large current is caused in the DC electric power system.

Therefore, with the current interrupting device 10 in this embodiment, it is possible to suitably execute, with a single device, the current limiting and the interruption when the abnormal current is caused in both of the AC electrical power system and the DC electric power system. Especially, because the current interrupting device 10 is mainly realized with a simple circuit configuration in which the current limiting fuse 12, serving as the current limiting element, and the semiconductor power module 14 are arranged in parallel with each other, it is possible to configure the device so as to be simple and so as to have a small size as a whole. In other words, in this embodiment, the semiconductor power module 14, which has the interrupting function of the current but does not have the current limiting function, and the current limiting fuse 12, which has the current limiting function but does not have a sufficient interrupting function, are arranged in parallel with each other in the current interrupting device 10, and the current interrupting device 10 is configured to execute a suitable on/off operation of the semiconductor power module 14, and thereby, the current interrupting device 10 can be applied to both of the AC electrical power system and the DC electric power system, and at the same time, it is possible to execute the current limiting and the interruption while achieving the small size and the low cost.

The configuration of the current interrupting device 10 in this embodiment is suitable also from the viewpoint of executing the interruption, not only at the time of the occurrence of the abnormal current, also at situations, such as a maintenance, an inspection, a repair work, and so forth, at which the interruption of the steady current $I_s$ is required.

As described above, the current interrupting device 10 in this embodiment is provided with the following configurations, and operational advantages are achieved with such configurations.

The current interrupting device 10 in this embodiment is provided with: the current limiting fuse 12 serving as the current limiting element provided on the main power supply path C1 serving as a power supply path from the predetermined power supply 100 to the load device 200, the current limiting fuse 12 being configured to exhibit the current limiting action when the current flowing the main power supply path C1 (the fuse current $i_f$) exceeds the first current threshold value (the melting current $I_{th1}$); the semiconductor power module 14 serving as a current diversion path switch capable of switching on and off of the electric conduction of the current diversion path C2, the current diversion path C2 being connected in parallel with the main power supply path C1; and the controller 20, serving as a controller, configured to control on and off of the semiconductor power module 14.

The controller 20 is configured to switch the semiconductor power module 14 on from the off state when it is detected that the current flowing the current limiting fuse 12 (the fuse current $i_f$) is limited to a second current threshold value (the current-diversion threshold value $i_{th2}$) after the current flowing the current limiting fuse 12 has exceeded the melting current $I_{th1}$ (time t3 in FIG. 3). Furthermore, the controller 20 is configured to switch off the semiconductor power module 14 again after the predetermined switched-on holding time Δt has elapsed since the semiconductor power module 14 has been switched on (time t4).

By doing so, when the fuse current $i_f$ exceeds the melting current $I_{th1}$, the current limiting is performed by the current limiting fuse 12 to a certain extent (the current limiting to the point where the fuse current $i_f$ reaches the current-diversion threshold value $i_{th2}$) in a state in which the semiconductor power module 14 is maintained at the off state, and subsequently, the semiconductor power module 14 is switched on (time t2 to time t3 in FIG. 3). After the predetermined switched-on holding time Δt has elapsed, the semiconductor power module 14 is then switched to the off state (time t4 in FIG. 3). In other words, when the fuse current $i_f$ caused by the occurrence of the abnormal current exceeds the melting current $I_{th1}$, the interruption is executed by the semiconductor power module 14 via the current limiting performed by the current limiting element.

Therefore, with a simple circuit configuration realized by mainly combining the current limiting fuse 12 and the semiconductor power module 14, by performing the simple control in which the semiconductor power module 14 is switched on and off at the suitable timings, the device capable of realizing both of the current limiting and the interruption at the time of the occurrence of the abnormal current in the electric power system of any type is provided.

In addition, with the configuration of the current interrupting device 10 in this embodiment, while performing the current limiting by the current limiting fuse 12 when the abnormal current is caused, the interruption is realized, not by using the current limiting fuse 12, but by switching the semiconductor power module 14 off from the on state. Thus, it is possible to suitably execute the current limiting and the interruption of the abnormal current without receiving restriction by the limit of the current limiting action of the current limiting fuse 12.

Furthermore, in the current interrupting device 10 in this embodiment, the current-diversion threshold value $i_{th2}$ is set such that the current, which flows when the semiconductor power module 14 is switched on from the off state (the diverted current from the current limiting fuse 12), becomes equal to or lower than the allowable current of the semiconductor power module 14, the allowable current being defined by design.

With such a configuration, the semiconductor power module 14 is switched on at the timing at which the module current $i_{pm}$ immediately after the semiconductor power module 14 is switched on (immediately after the diversion) becomes equal to or lower than the design allowable current of the semiconductor power module 14. Thus, it is possible to execute the diversion of the current while protecting the semiconductor power module 14 from the excessive current.

In addition, conversely, it is possible to arbitrary set the timing at which the semiconductor power module 14 is to be switched on from the off state within a range in which the module current $i_{pm}$ is equal to or lower than the allowable current of the semiconductor power module 14. In other words, the shifting to the current diversion can be achieved in a suitable manner in accordance with a request that the shifting to the current diversion is to be achieved at the possible earliest timing within a range in which the module current $i_{pm}$ becomes equal to or lower than the allowable current, or in accordance with a request that the shifting to the current diversion is to be achieved after allowing the current limiting by the current limiting fuse 12 to be progressed to the utmost extent.

Furthermore, the above-described switched-on holding time Δt is set such that the electrical resistance of the current limiting fuse 12 exceeds the predetermined resistance threshold value at the timing at which the semiconductor power module 14 is switched off again (time t4).

By doing so, in a state in which the semiconductor power module 14 is maintained at the on state, in addition to the effect of consuming the residual electrical energy of the abnormal current by the flow of the current in the current diversion path C2, it is possible to make the residual electrical energy of the abnormal current to be consumed as much as possible also by causing the current limiting action by the current limiting fuse 12 to be exhibited as much as possible. Thus, it is possible to prevent occurrence of a situation in which the current flows the current limiting fuse 12 again due to the residual electrical energy of the abnormal current when the semiconductor power module 14 is switched off again. In other words, the interruption is realized in a suitable manner by switching the semiconductor power module 14 off again.

Furthermore, with the current interrupting device 10 in this embodiment, because the semiconductor power module 14 is employed as the current diversion path switch, it is possible to achieve a fast switching operation. Therefore, it is possible to execute the current diversion (time t3 in FIG. 3) and the interruption (time t4 in FIG. 3) realized by the control of the semiconductor power module 14 at a high control responsiveness. Thus, it is possible to further shorten the processing time from the occurrence of the abnormal current to the completion of the interruption via the current limiting and the current diversion. Thus, it is possible to more surely prevent the occurrence of the damage of the electric installation caused by the practical flow of the large current due to the abnormal current in the electric power system caused by the delay of the execution of the respective processes.

In a conventional semiconductor breaker (for example, see Publication of Japanese Patent No. 6497488), fundamentally, the semiconductor switch functions as a conduction path during a steady operation by being maintained at the on state. Therefore, due to the passage of the electricity through the semiconductor switch, resistance loss and heat loss are caused for the semiconductor switch.

In contrast, with the configuration of the current interrupting device 10 in this embodiment, the semiconductor power module 14 is maintained at the off state except for the relatively short time period immediately before the timing of the interruption of the abnormal current (time t4). Thus, the occurrence of the problems related to the resistance loss and the heat loss described above in the conventional semiconductor breaker are also suppressed.

In addition, in this embodiment, the current limiting fuse 12 is employed as the current limiting element. In other words, it is possible to realize the current limiting action required for executing the interruption in the semiconductor power module 14 by using the current limiting fuse 12 of the general purpose type. Especially, in the current interrupting device 10 in this embodiment, the interruption is executed by the operation of the semiconductor power module 14. Thus, in contrast to the existing device in which the practical interruption is required to be achieved by the function of the current limiting element itself, the current limiting fuse 12 is not necessarily required to have the current limiting capacity to the extent that the interruption is achieved. In other words, the current limiting function is required for the current limiting fuse 12 to an extent at least sufficient for executing the interruption by the semiconductor power module 14 without interference. Therefore, as the current limiting fuse 12 to be used in the current interrupting device 10, a component with standard current limiting function may be used, and a special component with a high current limiting capacity is not required. Therefore, it is possible to increase the versatility of the components that can be employed as the current limiting element. As a result, it is possible to improve a degree of design freedom, and at the same time, it is also possible to achieve the suppression of the manufacturing cost.

Furthermore, in this embodiment, provided is a current interrupting method executed in the current interrupting device 10, the current interrupting device 10 being provided with: the current limiting fuse 12 serving as the current limiting element provided on the main power supply path C1 from the predetermined power supply 100 to the load device 200, the current limiting fuse 12 being configured to exhibit the current limiting action when the current flowing the main power supply path C1 (the fuse current $i_f$) exceeds the first current threshold value (the melting current $I_{th1}$); and the semiconductor power module 14 serving as the current diversion path switch capable of switching on and off of the electric conduction of the current diversion path C2, the current diversion path C2 being connected in parallel with the main power supply path C1.

In this current interrupting method, the semiconductor power module 14 is switched on from the off state when it is detected that the current flowing the current limiting fuse 12 (the fuse current $i_f$) is limited to the second current threshold value (the current-diversion threshold value $i_{th2}$) after the current flowing the current limiting fuse 12 has exceeded the melting current $I_{th1}$ (time t3 in FIG. 3). Furthermore, the semiconductor power module 14 is switched off again after the predetermined switched-on holding time Δt has elapsed since the semiconductor power module 14 has been switched on (time t4).

By doing so, it is possible to provide the current interrupting method using the current interrupting device 10, the current interrupting method being capable of realizing both of the current limiting and the interruption of the abnormal current in a suitable manner.

Second Embodiment

In the following, a second embodiment will be described. Components that are similar to those in the first embodiment are assigned the same reference signs, and descriptions thereof shall be omitted.

Figure 6:
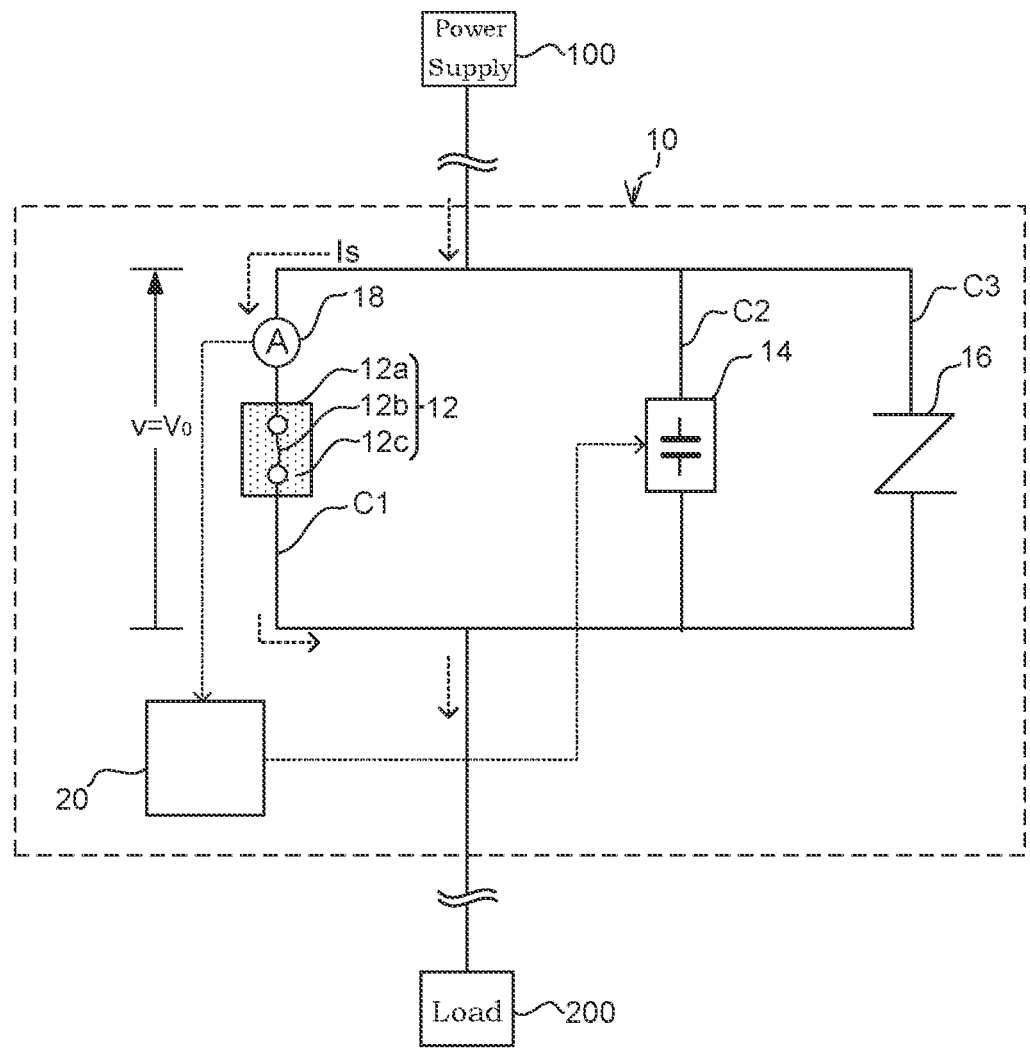
FIG. 6 is a diagram explaining a configuration of the current interrupting device according to a second embodiment.

FIG. 6 is a diagram explaining the configuration of the current interrupting device 10 according to the second embodiment. As shown in the figure, in the current interrupting device 10 in this embodiment, in addition to the configuration of the current interrupting device 10 in the first embodiment, a transient current path C3 is connected in parallel with the main power supply path C1 and the current diversion path C2, and a varistor 16 serving as an overvoltage suppression element is provided on the transient current path C3.

The varistor 16 shows the electrical resistance that is high enough so as to be able to be considered as an insulating body practically when a terminal voltage v between the power supply 100 and the load device 200 is equal to or lower than a varistor voltage $V_{th}$, which is defined in advance in accordance with the design of the varistor 16. On the other hand, the varistor 16 has a characteristic whereby, when the terminal voltage v is larger than the varistor voltage $V_{th}$, it allows the current to flow for decreasing the terminal voltage v in accordance with the level of the terminal voltage v. Especially, the varistor voltage $V_{th}$ is set at a value at least higher than the steady voltage $V_0$. In the following, the function of the current interrupting device 10 provided with the varistor 16 will be described.

Because the terminal voltage v (≈the steady voltage $V_0$) in the process from the occurrence of the abnormal current to the interruption via the current limiting is less than the varistor voltage $V_{th}$, the electrical conduction of the transient current path C3 on which the varistor 16 is provided is also practically interrupted. Thus, in the current interrupting device 10 in this embodiment, the behavior in the process from the normal state to the interruption of the abnormal current is similar to that in a case for the current interrupting device 10 described in the first embodiment.

On the other hand, in the current interrupting device 10 in this embodiment, the varistor 16 functions so as to cancel out recovery voltage $V_{ind}$ caused when the abnormal current is interrupted (when the semiconductor power module 14 is switched off again).

Figure 7A:
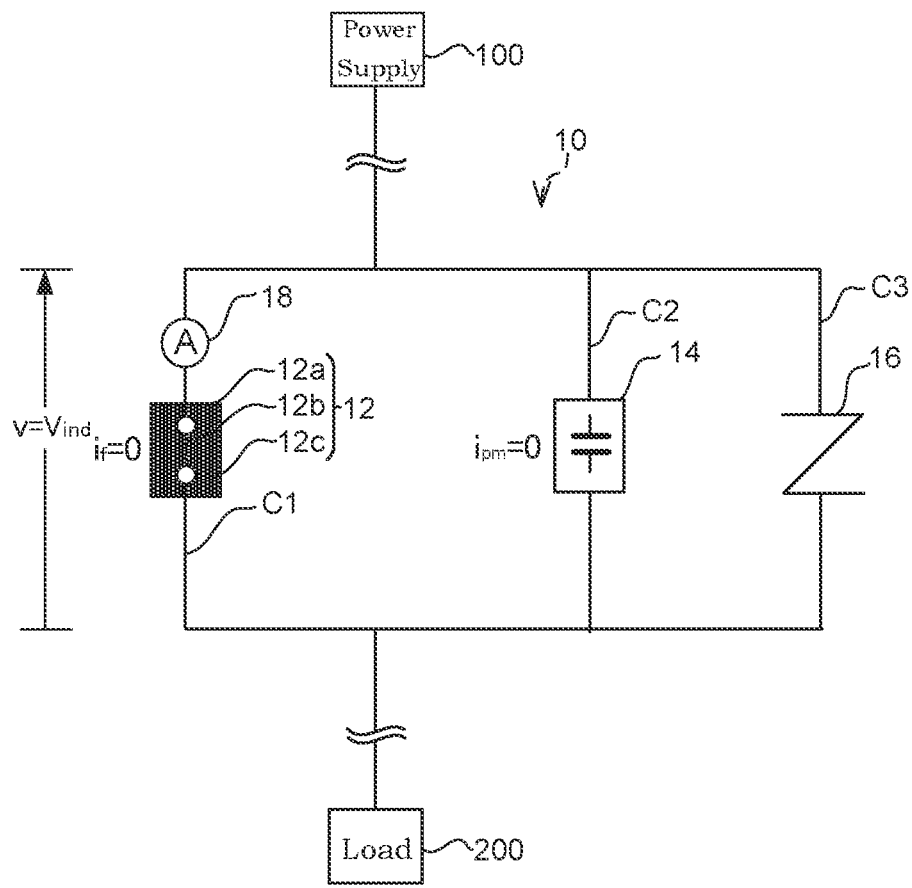
FIG. 7A is a diagram explaining a state in which recovery voltage is caused upon completion of the interruption of the abnormal current.
Figure 7B:
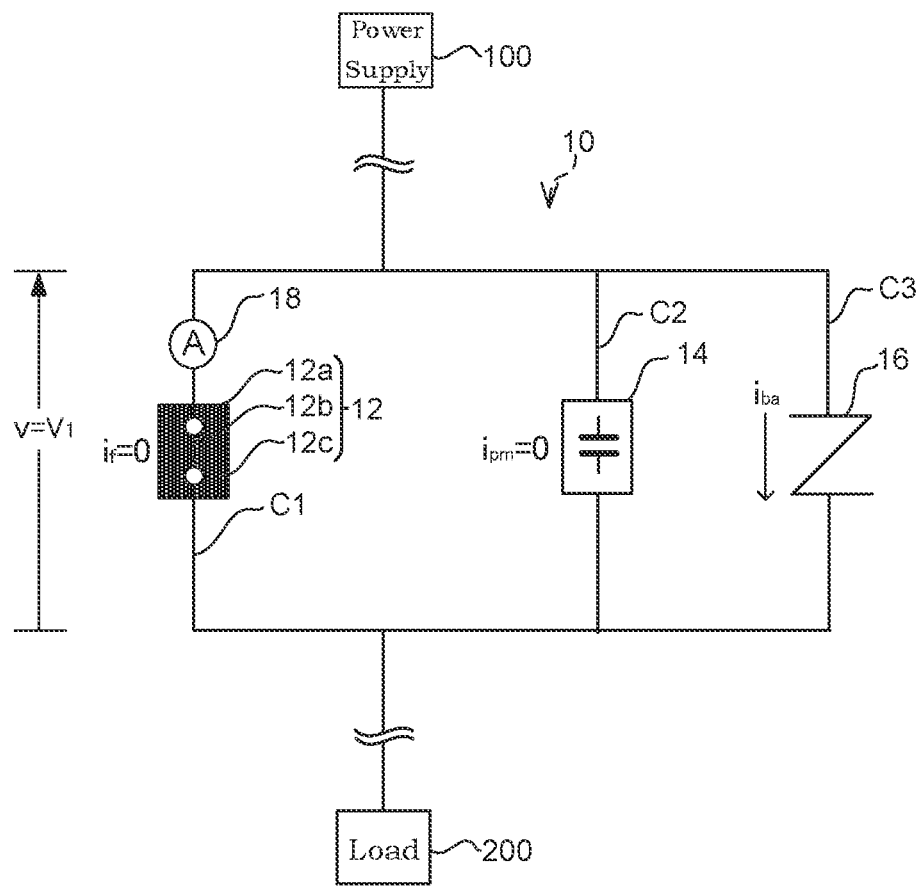
FIG. 7B is a diagram explaining a state in which recovery voltage $V_{ind}$ is eliminated.

FIG. 7A shows a state in which the recovery voltage $V_{ind}$ is caused when the interruption of the abnormal current is completed in the current interrupting device 10. In addition, FIG. 7B shows a state in which the recovery voltage $V_{ind}$ is eliminated. Furthermore, FIG. 8 is a graph explaining changes in voltage and current over time in the current interrupting device 10 from the occurrence of the abnormal current to the elimination of the recovery voltage $V_{ind}$ via the current limiting and the interruption.

Figure 8:
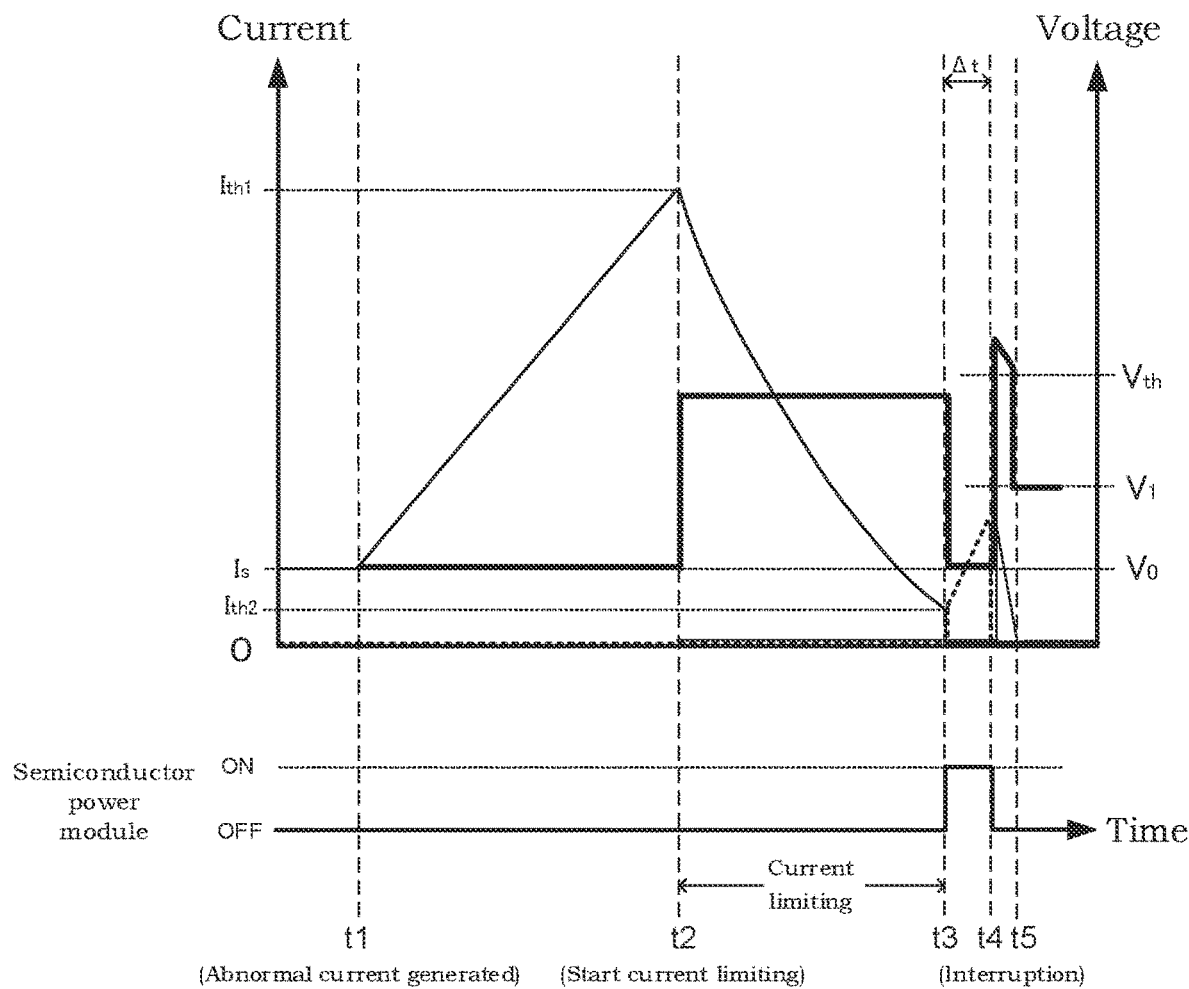
FIG. 8 is a graph explaining changes in voltage and current over time from occurrence of the abnormal current to the elimination of the recovery voltage via the current limiting and the interruption.

As shown in FIG. 7A, in the current interrupting device 10 in this embodiment, by switching the semiconductor power module 14 off again in order to achieve the interruption, the module current $i_{pm}$ changes to substantially zero from the value during the current diversion, which in turn results in occurrence of the recovery voltage $V_{ind}$ that is induced so as to cancel out the change (after time t4 in FIG. 8).

In contrast, because the current interrupting device 10 in this embodiment is provided with the varistor 16, as the recovery voltage $V_{ind}$ is increased successively and reaches the varistor voltage $V_{th}$, the electric conduction state of the varistor 16 is switched on from the off state to allow current (varistor current $i_{ba}$) to flow in the direction in which the recovery voltage $V_{ind}$ is decreased (see FIG. 7B). Therefore, it is possible to suppress application of voltage exceeding the design allowable value to electrical components (especially, the semiconductor power module 14) forming the current interrupting device 10 due to the occurrence of the recovery voltage $V_{ind}$.

Thus, in this embodiment, the transient state of the current and voltage in the current interrupting device 10 is eliminated promptly by a suppression effect for the recovery voltage $V_{ind}$ by the varistor 16 after the completion of the current limiting and the interruption of the abnormal current.

Therefore, it is possible to shorten the time required to recover the power supply after the interruption of the abnormal current.

As a further modification of the current interrupting device 10 in this embodiment, it may be possible to employ a process of temporarily recovering the power supply by switching the semiconductor power module 14 on again and using the current diversion path C2 (a temporal recovery process) in a case in which it is determined that the terminal voltage v of the current interrupting device 10 is returned to a predetermined final voltage $V_1$ close to the steady voltage $V_0$ by the elimination of the abnormal current. With such a temporal recovery process, it is possible to shorten the time required for the process compared with the time required for a normal recovery process (including replacement of the current limiting fuse 12, etc.) (for example, the time can be shortened from about several hundreds of milliseconds to about several milliseconds or shorter).

In addition, as described above, because the power supply from the power supply 100 to the load device 200 can be recovered, at least temporarily, after the current limiting and the interruption of the abnormal current, it is possible to suppress the occurrence of a malfunction caused by a loss of the power supply function from the power supply 100 to the load device 200 over a period from the occurrence of the abnormal current to the full repair work of the current interrupting device 10 such as the replacement of the current limiting fuse 12, etc. (a power failure in an electric power demanding installation, which is assumed as the load device 200, over a long period of time). It is possible to recover the steady power supply state via the main power supply path C1 by replacing the current limiting fuse 12 after restoring the power supply temporarily by switching the semiconductor power module 14 described above on again, and thereafter, by switching the semiconductor power module 14 off.

Furthermore, when the full repair work of the current interrupting device 10 described above is to be performed, even in a state in which the current limiting fuse 12 is not functioning, it is possible to easily and safely start the repair work because the power supply from the power supply 100 to the load device 200 can be interrupted completely only by switching off the semiconductor power module 14 capable of interrupting the steady current $I_s$.

Specifically, in such a situation, if the current limiting fuse 12 is temporarily removed while switching on the semiconductor power module 14, which is in the off state in the steady state, the current diversion path C2 will function as the electric conduction path of the steady current $I_s$. Therefore, by switching off the semiconductor power module 14 in this state, it is possible to interrupt the steady current $I_s$ in a suitable manner.

As described above, the current interrupting device 10 in this embodiment is provided with the following configurations, and operational advantages are achieved with such configurations.

The current interrupting device 10 in this embodiment is further provided with the varistor 16 serving as the overvoltage suppression element arranged in parallel with the semiconductor power module 14. The varistor 16 is configured to function as a substantially insulating element when a terminal voltage of the varistor 16 (the terminal voltage v) is equal to or lower than a predetermined threshold value voltage (the varistor voltage $V_{th}$), the varistor 16 being configured to function as a conductor when $V_{th}$ is higher than the varistor voltage $V_{th}$. The varistor 16 is configured so as to have the varistor voltage $V_{th}$ lower than induced voltage (the recovery voltage $V_{ind}$) caused due to current change caused when the semiconductor power module 14 is switched off again.

In addition to the current limiting fuse 12 and the semiconductor power module 14 described above, by providing the varistor 16 having such a characteristic, it is possible to promptly eliminate the recovery voltage $V_{ind}$ that is caused due to the switching of the semiconductor power module 14 to the off state to achieve the interruption. Therefore, it is possible to promptly recover the state of the electric power system to which the current interrupting device 10 is applied to the steady state.

Third Embodiment

In the following, a third embodiment will be described. Components that are similar to those in the first and second embodiments are assigned the same reference signs, and descriptions thereof shall be omitted.

Figure 9:
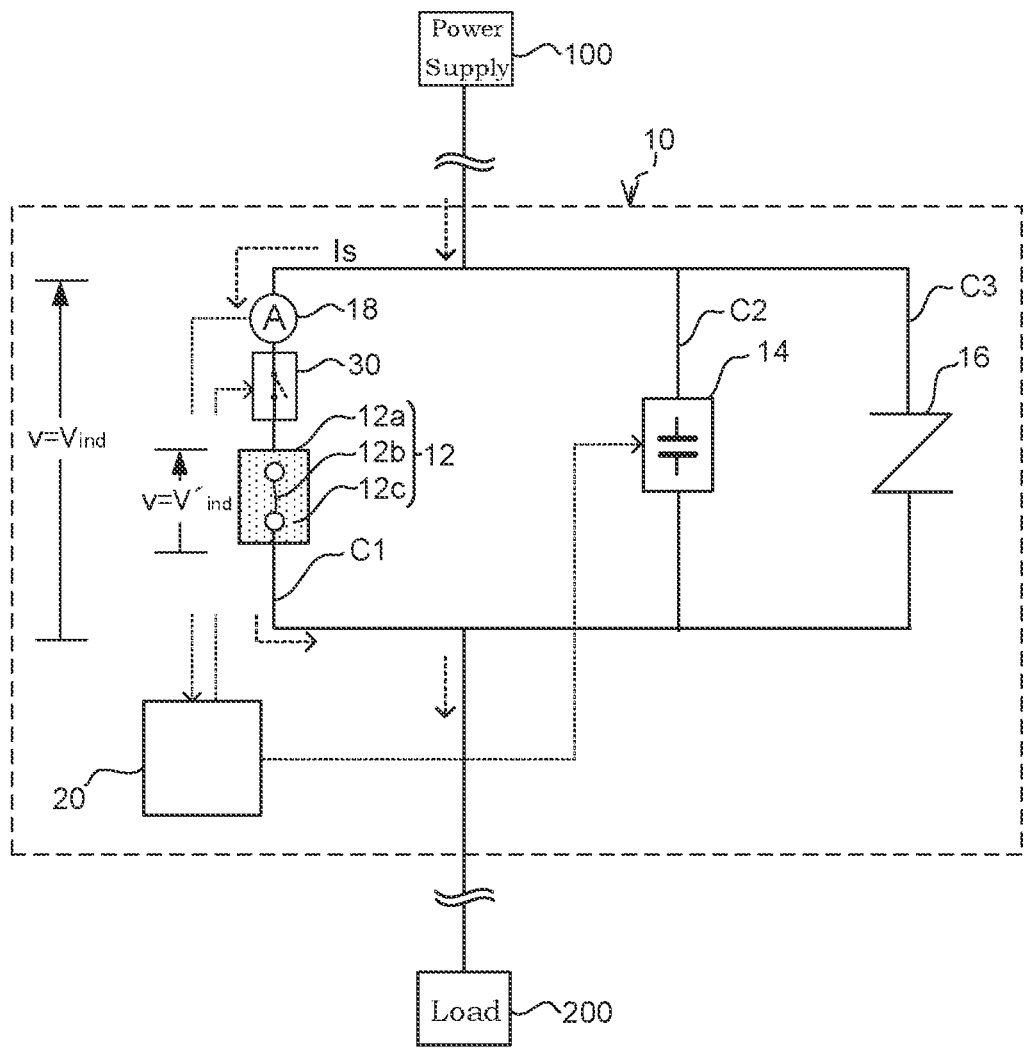
FIG. 9 is a diagram explaining a configuration of the current interrupting device according to a third embodiment.

FIG. 9 is a diagram explaining a configuration of the current interrupting device 10 according to the third embodiment. As shown in the figure, the current interrupting device 10 in this embodiment is provided with a mechanical switch device 30, which is in series with the current limiting fuse 12, in addition to the configuration of the current interrupting device 10 according to the second embodiment.

The mechanical switch device 30 is formed of a mechanical relay, etc. for switching on/off of the electrical conduction state of the main power supply path C1. The on/off of the mechanical switch device 30 is controlled by the controller 20. Especially, the mechanical switch device 30 in this embodiment is formed of a normal close relay that takes an on state (a closed state) in the normal state.

The controller 20 switches the mechanical switch device 30 off from the on state at a predetermined timing after the fuse current $i_f$ has reached the melting current $I_{th1}$ (in other words, time t2 to time t4 in FIG. 8).

As described above, the current interrupting device 10 in this embodiment is provided with the following configurations, and operational advantages are achieved with such configurations.

The current interrupting device 10 in this embodiment is further provided with the mechanical switch device 30 serving as a switch device provided in series with the current limiting fuse 12. The controller 20 is configured to switch the mechanical switch device 30 off from the on state at a predetermined timing, the predetermined timing being after the fuse current $i_f$ has exceeded the melting current $I_{th1}$ and before the semiconductor power module 14 is switched off again from the on state.

With such a configuration, at the timing at which at least the semiconductor power module 14 is switched off again (time t4 in FIG. 8), the mechanical switch device 30 that is arranged in series with the current limiting fuse 12 functions as an element having a relatively high resistance. Therefore, it is possible to reduce the voltage applied to the current limiting fuse 12 that is connected in series with the mechanical switch device 30 at the time of occurrence of the recovery voltage $V_{ind}$ ("$V'_{ind}$" in FIG. 9). Therefore, it is possible to suitably maintain an insulation recovery function of the current limiting fuse 12 by suppressing a dielectric breakdown in the current limiting fuse 12 due to the recovery voltage $V_{ind}$, and so, it is possible to more reliably prevent recurrence of the abnormal current.

Especially, the timing at which the mechanical switch device 30 is switched off from the on state can be set in an arbitrary period after the time at which the fuse current $i_f$ has reached the melting current $I_{th1}$ (the time at which the abnormal current is detected at time t2) and before the time at which the semiconductor power module 14 is switched off again (before time t4). Thus, it is possible to realize the suppression effect of the applied voltage to the current limiting fuse 12 without posing a restriction on the on/off operation of the semiconductor power module 14 for the current limiting and the interruption in relation with the timing at which the mechanical switch device 30 is switched off.

Furthermore, in this embodiment, because the mechanical switch device 30 is switched off from the on state after the current limiting by the current limiting fuse 12 has started, there is practically no effect on a circuit operation (the current path, etc.) in the process from the current limiting by the switching to the interruption. Therefore, similarly to the case in which the mechanical switch device 30 is not provided (the cases in the first embodiment and the second embodiment), it is possible to more suitably exhibit the suppression effect of the applied voltage to the current limiting fuse 12 when the recovery voltage $V_{ind}$ is caused while realizing the current limiting and interrupting function of the abnormal current.

In this embodiment, a description has been given of an example in which the mechanical switch device 30 is employed as a switch device that is provided in series with the current limiting fuse 12. However, the present invention is not limited thereto, and it may be possible to employ the switch device of other types such as a semiconductor relay, etc. as long as the main power supply path C1 can be set to the electrical conduction state (a low resistance state) so as not to interfere with the power supply in the steady state, and the main power supply path C1 can be set to a non-electrical conduction state (a high resistance state) after the occurrence of the abnormal current and before the occurrence of the recovery voltage $V_{ind}$.

Fourth Embodiment

In the following, a fourth embodiment will be described. Components that are similar to those in the first to third embodiments are assigned the same reference signs, and descriptions thereof shall be omitted. In this embodiment, provided is one aspect of a mechanism for replacing the current limiting fuse 12 that has been used after the abnormal current is eliminated and the terminal voltage v of the current interrupting device 10 is returned to the final voltage $V_1$ close to the steady voltage $V_0$ (after time t5 in FIG. 8).

Figure 10:
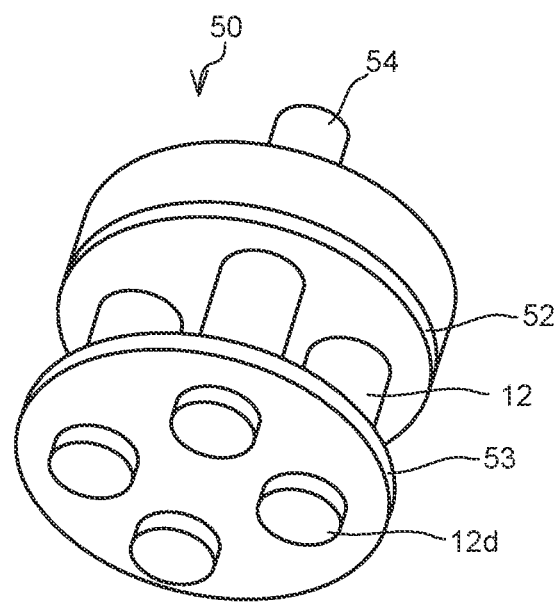
FIG. 10 is a diagram explaining a configuration of a fuse replacing mechanism according to a fourth embodiment.

FIG. 10 is a perspective view of relevant parts of a fuse replacing mechanism 50 in this embodiment. As shown in the figure, the fuse replacing mechanism 50 is provided with a revolver 54 that holds a plurality of current limiting fuses 12 aligned in the circumferential direction. The current limiting fuses 12 are each held by the revolver 54 at its first end via an insulating plate 52. In addition, an insulating plate 53 is attached to a second end of each of the current limiting fuses 12 such that a connector 12d for ensuring the electrical connection with the main power supply path C1 is exposed. By rotating the revolver 54, the fuse replacing mechanism 50 realizes a function of automatically replacing the current limiting fuse 12, which has been used for the current limiting of the abnormal current, with a fresh current limiting fuse 12. In the following, the details thereof will be described.

Figure 11A:
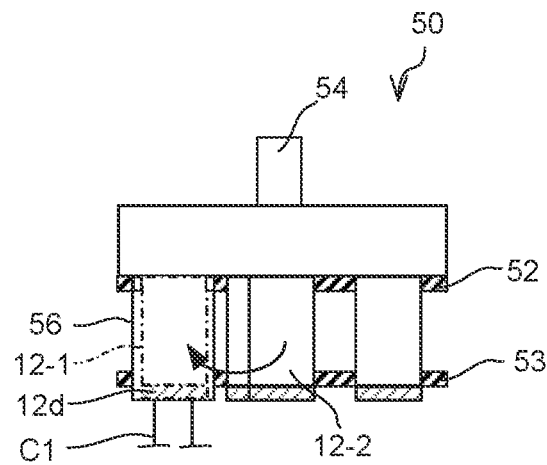
FIG. 11A is a diagram explaining an operation of the fuse replacing mechanism.
Figure 11B:
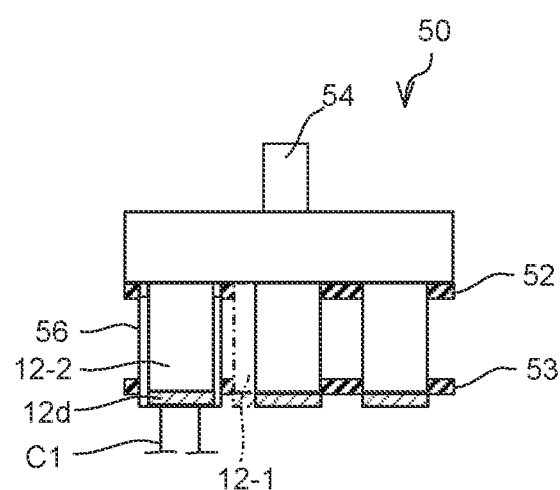
FIG. 11B is a diagram explaining the operation of the fuse replacing mechanism.

FIGS. 11A and 11B are each a diagram explaining operation of the fuse replacing mechanism 50. In the following, the description will be given by assigning a reference sign "12-1" to the current limiting fuse 12 that has been used and by assigning a reference sign "12-2" to the fresh current limiting fuse 12 that is to be installed in place of the current limiting fuse 12-1 that has been used. In addition, in FIGS. 11A and 11B, the current limiting fuse 12-1 that has been used is shown by a one-dot chain line.

As shown in the figure, the current limiting fuses 12 are set in the current interrupting device 10 in a state in which each of the current limiting fuses 12 is mounted in a fuse holder 56 having opening portions (not shown) on the front side and the back side of the plane of the drawing so as to allow passage of the current limiting fuse 12 as the revolver 54 is rotated. As the revolver 54 is rotated, the current limiting fuse 12-1 that has been used for the current limiting of the abnormal current is removed from the fuse holder 56, and the fresh current limiting fuse 12-2 is mounted by being moved into the fuse holder 56 in a sliding manner.

As described above, by using the fuse replacing mechanism 50 that replaces the current limiting fuse 12 with the rotation of the revolver 54, it is possible to shorten the time required for the replacement of the current limiting fuse 12. Especially, even if the time required to rotate the revolver 54 is taken into account, the replacement can be achieved on the order of about several hundreds of milliseconds. Especially, from the viewpoint of promptly starting the automatic replacement of the current limiting fuse 12-1 that has been used, it is preferred to employ a configuration in which the rotation of the revolver 54 is started on the basis of an instruction from the controller 20 that detects the elimination of the abnormal current. Especially, it is preferable that the controller 20 be programmed so as to start rotating operation of the revolver 54 when the controller 20 determines that the terminal voltage v is returned to the final voltage $V_1$ close to the steady voltage $V_0$ after the timing at which the semiconductor power module 14 is switched off again (time t4 in FIG. 8).

In the configuration in this embodiment, the temporal recovery process of the power supply, which is described in the second embodiment, may also be used in combination. More specifically, the controller 20 may be programmed so as to, when the controller 20 determines that the terminal voltage v is returned to the final voltage, start the rotating operation of the revolver 54 and switch the semiconductor power module 14 on again (start temporal power supply using the current diversion path C2), and so as to switch the semiconductor power module 14 off once the replacement of the current limiting fuse 12 is completed (the temporal power supply is finished and a steady power supply state via the main power supply path C1 is recovered).

By doing so, even during the replacement of the current limiting fuse 12 by the fuse replacing mechanism 50 described above, it is possible to execute the power supply by using the current diversion path C2 on which the semiconductor power module 14 is in the on state. Especially, because the time required to replace the current limiting fuse 12 is shortened with the fuse replacing mechanism 50 in this embodiment, an executing time of the temporal power supply using the current diversion path C2 can be shortened even further, and therefore, a contribution to further improvement of a redundantness and a safety of the device is achieved. The configuration of the fuse replacing mechanism 50 in this embodiment is illustrative, and the configuration is not limited thereto. It is possible to employ a device having an arbitrary form that is capable of automatically executing the replacement of the current limiting fuse 12.

Although the embodiments of the present invention have been described in the above, the above-mentioned embodiments merely illustrate a part of application examples of the present invention, and the technical scope of the present invention is not intended to be limited to the specific configurations of the above-described embodiments.

For example, in the current interrupting device 10 in the above-mentioned embodiment, a description has been given of an example in which the current limiting fuse 12 is employed as the current limiting element. However, the current limiting element other than the current limiting fuse 12 may also be employed in the current interrupting device 10. For example, instead of employing the current limiting fuse 12, a superconducting current limiting device using a superconducting element (see WO2012/161277), a current limiting reactor, or the like may also be employed. In other words, it is possible to appropriately employ, as the current limiting element, an arbitrary element having a current limiting characteristic that while it functions as a low electrical resistance body (preferably, practically a conductor) for the current equal to or lower than a predetermined current threshold value, when the current exceeds the current threshold value, the electrical resistance is increased in response to the increase in the current.

In addition, in the current interrupting device 10 in the above-mentioned embodiment, a description has been given of an example in which the semiconductor power module 14 is employed as the current diversion path switch. However, it may be possible to employ a current diversion path switch other than the semiconductor power module 14 as long as it can be appropriately switched on/off (closed/opened) by the instruction signal from the controller 20 and as long as it has a function of allowing the current diversion of the fuse current $i_f$ at the time of being switched on (time t3 in FIG. 3) and allowing the interruption at a state in which a small current is flowing (switched off).

For example, instead of the semiconductor power module 14, it may be possible to employ switches such as the vacuum circuit breaker, the mechanical relay having an interrupting function, or the like. On the other hand, from the viewpoint of increasing the speed of the current limiting and the interruption, it is preferable to employ the semiconductor power module 14 capable of being on/off operated on the order of several milliseconds as the current diversion path switch.

In addition, even in a case in which the current limiting element other than the current limiting fuse 12 and the current diversion path switch other than the semiconductor power module 14 are employed, it is preferable to configure these with general-purpose circuit elements by taking an environmental feasibility into consideration. Especially, in the current interrupting device 10 in the above-mentioned embodiment, because they are can be configured by using such general-purpose circuit elements, a contribution is also achieve to reduction in the cost and improvement in a flexibility of a design.

In addition, the respective embodiments described above can be appropriately combined to the extent that they do not contradict each other.

The present application claims priority to Japanese Patent Application No. 2019-168601, filed before the Japan Patent Office on Sep. 17, 2019. The contents of this application are incorporated herein by reference in their entirety.

The invention claimed is:

1. A current interrupting device provided with:
   a current limiting element provided on a power supply path from a predetermined power supply to a load device, the current limiting element being configured to exhibit a current limiting action when current flowing in the power supply path exceeds a first current threshold value;
   a current diversion path switch capable of switching on and off of an electric conduction of a current diversion path, the current diversion path switch being connected in parallel with the power supply path; and
   a controller programmed to control on and off of the current diversion path switch, wherein
   the controller is programmed to:
      switch the current diversion path switch on from an off state when it is detected that current flowing in the current limiting element is limited to a second current threshold value after the current flowing in the current limiting element has exceeded the first current threshold value, and
      switch the current diversion path switch off again after a predetermined switched-on holding time has elapsed since the current diversion path switch has been switched on.

2. The current interrupting device according to claim 1, wherein
   the second current threshold value is set such that current flowing when the current diversion path switch is switched on from the off state becomes equal to or lower than an allowable current of the current diversion path switch, the allowable current being predetermined.

3. The current interrupting device according to claim 1, wherein
   the switched-on holding time is set such that an electrical resistance of the current limiting element exceeds a predetermined resistance threshold value at a timing at which the current diversion path switch is switched off again.

4. The current interrupting device according to claim 1, further comprising
   an overvoltage suppression element arranged in parallel with the current diversion path switch, wherein
   the overvoltage suppression element is configured to function as an insulating element when a terminal voltage of the overvoltage suppression element is equal to or lower than a predetermined threshold value voltage, the overvoltage suppression element being configured to function as a conductor when the terminal voltage is higher than the threshold value voltage, and
   the overvoltage suppression element is configured so as to have the threshold value voltage lower than induced voltage due to current change caused when the current diversion path switch is switched off again.

5. The current interrupting device according to claim 1, further comprising a switch device provided in series with the current limiting element, wherein the controller is programmed to switch the switch device off from an on state at a predetermined timing, the predetermined timing being after current flowing in the current limiting element has exceeded the first current threshold value and before the current diversion path switch is switched off again.

6. The current interrupting device according to claim 1, wherein the current diversion path switch is a semiconductor power module.

7. The current interrupting device according to claim 1, wherein the current limiting element is a current limiting fuse.

8. A current interrupting method executed in a current interrupting device, the current interrupting device being provided with: a current limiting element provided on a power supply path from a predetermined power supply to a load device, the current limiting element being configured to exhibit a current limiting action when current flowing in the power supply path exceeds a first current threshold value; and a current diversion path switch capable of switching on and off of an electric conduction of a current diversion path, the current diversion path switch being connected in parallel with the power supply path, wherein
   the current diversion path switch is switched on from an off state when it is detected that current flowing in the current limiting element is limited to a second current threshold value after the current flowing in the current limiting element has exceeded the first current threshold value, and
   the current diversion path switch is switched off again after a predetermined switched-on holding time has elapsed since the current diversion path switch has been switched on.

9. A current interrupting device provided with:
   a current limiting element provided on a power supply path from a predetermined power supply to a load device, the current limiting element being configured to exhibit a current limiting action when current flowing in the power supply path exceeds a first current threshold value;
   a current diversion path switch configured to switch on and off an electric conduction of a current diversion path, the current diversion path switch being connected in parallel with the power supply path;
   a current sensor configured to detect current flowing in the power supply path; and
   a controller programmed to control on and off of the current diversion path switch with reference to a current detected value obtained by the current sensor, wherein
   the controller is programmed to:
      switch the current diversion path switch on from an off state when it is determined that the current detected value is decreased to a second current threshold value after exceeding the first current threshold value, and
      switch the current diversion path switch off again after a predetermined switched-on holding time has elapsed since the current diversion path switch has been switched on, such that the power supply path from the predetermined power supply to the load device is interrupted.

10. The current interrupting device according to claim 9, wherein
   the switched-on holding time is set as a time for a resistance of power supply path increasing to a predetermined value after the current diversion path switch is switched on.

11. The current interrupting device according to claim 9, wherein
   the switched-on holding time is set as a time needed for the current detected value decreasing from the second current threshold value to a predetermined value after the current diversion path switch is switched on.

12. The current interrupting device according to claim 9, wherein
   the current limiting element comprises a current limiting fuse that has a fusing element and an arc-extinguishing sand,
   the first current threshold value is set as a current value at which the fusing element starts to melt, and
   the second current threshold value is set in advance based on a duration of a current limiting action by the arc-extinguishing sand after the fusing element has reached a fused state.

\* \* \* \* \*